(No Model.)

W. L. HEISKELL & F. E. DRAKE.
FLASH TORCH.

No. 422,778. Patented Mar. 4, 1890.

WITNESSES:

INVENTOR
W. L. Heiskell
F. E. Drake
BY Munn &Co.
ATTORNEY

UNITED STATES PATENT OFFICE.

WILLIAM L. HEISKELL, OF INDIANAPOLIS, INDIANA, AND FRANCIS E. DRAKE, OF COLUMBUS, OHIO.

FLASH-TORCH.

SPECIFICATION forming part of Letters Patent No. 422,778, dated March 4, 1890.

Application filed March 9, 1889. Renewed January 31, 1890. Serial No. 338,721. (No model.)

*To all whom it may concern:*

Be it known that we, WILLIAM L. HEISKELL, of Indianapolis, in the county of Marion and State of Indiana, and FRANCIS E. DRAKE, of Columbus, in the county of Franklin and State of Ohio, have invented a new and Improved Flash-Torch, of which the following is a full, clear, and exact description.

Our invention relates to an improvement in flash-torches especially adapted to be used in connection with theatricals, tableaux, and for society purposes, and has for its object to provide a device of simple and durable construction in which the powder-conduit from the magazine to the lamp will be straight and direct, thereby insuring effective operation at all times, and also wherein the several parts of the torch may be readily detached and the entire device conveniently filled and cleaned.

The invention consists in the novel construction and combination of the several parts, as will be hereinafter fully set forth, and pointed out in the claims.

Reference is to be had to the accompanying drawings, forming a part of this specification, in which similar letters and figures of reference indicate corresponding parts in both views.

Figure 1:
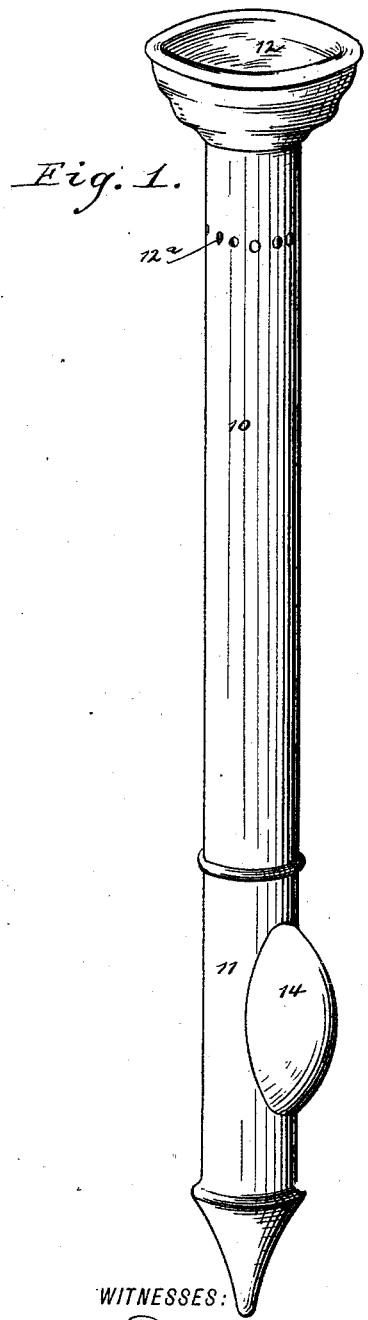
Figure 2:
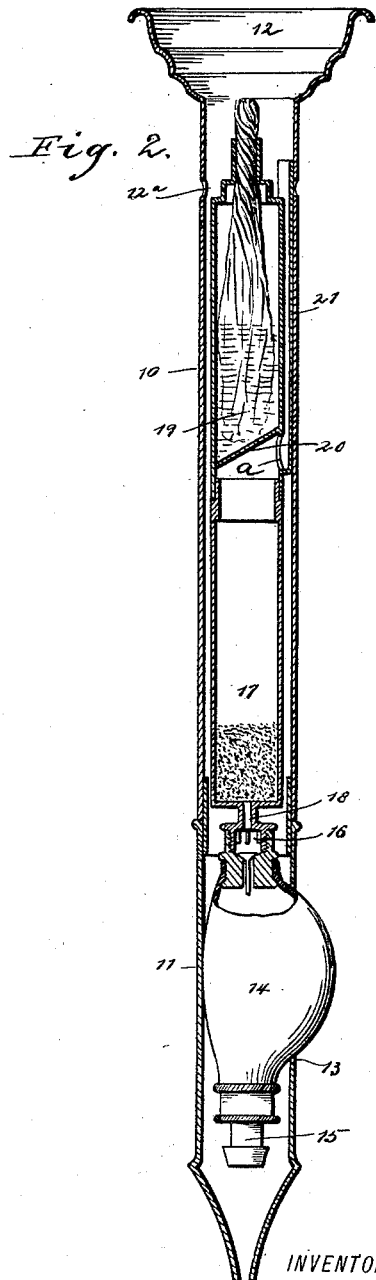

Figure 1 is a perspective view of the torch, and Fig. 2 is a central vertical section through the same.

In carrying out the invention the body or casing of the torch is made in two tubular sections 10 and 11, the upper section, which is the longer, being preferably made to slide over a suitable sleeve integral with the lower section. The upper section 10 is provided with a bell-mouth 12 and air-inlet apertures 12ª, circumferentially arranged below said mouth. The lower end of the lower section 11 of the casing is closed and preferably made to terminate in an ornament of any desired design, and in one side wall of the said lower section a longitudinal essentially-oval slot 13 is produced. The lower section is adapted to contain an air-bulb 14, a portion of which projects outward through the slot 13, whereby it may be readily compressed by the bearer of the torch while holding the same. The air-bulb 14 is provided with the usual type of inlet and outlet puppet-valves 15 and 16, as shown in Fig. 2.

To the upper or outlet valve a tube 17 is secured, having an open top and an aperture in the lower end surrounded by a downwardly-extending collar 18, which collar is connected with the outlet-valve of the bulb. The tube 17 is adapted to contain lycopodium or a similar explosive powder and is adapted to slide at the top into the bottom of a spirit-lamp 19. To accomplish this end, the lamp is made in tubular form, and the bottom is removed from the base of the tube and given an upward slant, as shown at 20 in Fig. 2.

Upon that side of the lamp-body to which the upwardly-inclined edge of the bottom is secured, a spout 21 is attached, having connection with the space below the lamp-bottom, as shown at *a*, which spout or delivery-tube extends vertically upward above the lamp-body to within a suitable distance of the wick, the inner side of the spout facing the wick-tube being preferably left open.

When the upper section of the casing is attached to the lower section, it incloses the powder-magazine and lamp and extends sufficiently far above the latter that the flame will be slightly within or below the bell-mouth, as shown in Fig. 2, whereby said flame is rendered invisible.

In operation, when it is desired to produce a flash, the bearer of the torch presses upon the exposed portion of the air-bulb, whereupon a portion of the powder in the magazine-tube is forced up into the delivery-tube and impinged upon the flame.

It will be observed that the passage for the powder from the magazine to the flame is practically straight, thereby insuring a successful delivery at all times, and that the several parts may be expeditiously and conveniently removed.

Having thus described our invention, what we claim as new, and desire to secure by Letters Patent, is—

1. In a flash-torch, the combination, with detachably-united casing-sections, the lower section having a side opening, and a valved air-bulb held in the lower casing-section, projecting through the opening therein, of a powder-magazine connected with said bulb, a lamp supported by the magazine, and a delivery-tube secured to the side of the lamp connected with the magazine and communicating with the lamp-wick, substantially as shown and described.

2. In a flash-torch, the combination, with detachably-united casing-sections, the upper section provided with a flaring mouth and air-vents, and the lower section having a side opening, of a valved air-bulb located in the lower section, projecting through the opening therein, a powder-magazine connected with said bulb, a lamp supported by the said magazine, having an inclined bottom and a space below the same, and a straight delivery-tube connected with the magazine below the lamp-bottom and extending upward above the lamp-body, all combined for operation substantially as shown and described.

WILLIAM L. HEISKELL.
FRANCIS E. DRAKE.

Witnesses:
GEORGE HENRY DIAMOND,
JOHN SIEBERT.